United States Patent [19]

Roney et al.

[11] Patent Number: 5,347,084
[45] Date of Patent: Sep. 13, 1994

[54] HINGED GEL-FILLED SECURITY AND ENVIRONMENTAL PROTECTION DEVICE

[75] Inventors: Karen Roney, Milford, Ohio; Michael Rafko, Apex, N.C.

[73] Assignee: Raychem Corporation, Menlo Park, Calif.

[21] Appl. No.: 988,050

[22] Filed: Dec. 7, 1992

Related U.S. Application Data

[63] Continuation-in-part of Ser. No. 712,320, Jun. 7, 1991, abandoned.

[51] Int. Cl.⁵ .................................... H01R 13/52
[52] U.S. Cl. ...................................... 174/92; 439/521
[58] Field of Search ............... 174/92, 93; 439/519, 439/521, 936

[56] References Cited

U.S. PATENT DOCUMENTS

| | | | |
|---|---|---|---|
| 3,325,591 | 6/1967 | Wahl | 174/138 |
| 4,210,380 | 7/1980 | Brzostek | 439/687 |
| 4,369,284 | 1/1983 | Chen | 524/476 |
| 4,451,696 | 5/1984 | Beinhaur | 174/92 |
| 4,595,635 | 6/1986 | Dubrow et al. | 428/447 |
| 4,600,261 | 7/1986 | Debbaut | 439/521 |
| 4,610,738 | 9/1986 | Jervis | 156/49 |
| 4,634,207 | 1/1987 | Debbaut | 439/521 |
| 4,704,499 | 11/1987 | Faust | 174/92 |
| 4,716,183 | 12/1987 | Gamarra et al. | 522/80 |
| 4,777,063 | 10/1988 | Dubrow et al. | 427/44 |
| 4,859,809 | 8/1989 | Jervis | 174/92 |
| 4,909,756 | 3/1990 | Jervis | 439/521 |
| 4,942,270 | 7/1990 | Gamarra | 174/93 |
| 4,998,894 | 3/1991 | Gronvall | 439/521 |

FOREIGN PATENT DOCUMENTS

| | | |
|---|---|---|
| 0196219 | 10/1986 | European Pat. Off. . |
| 0328386 | 8/1989 | European Pat. Off. . |
| 1947057 | 9/1968 | Fed. Rep. of Germany . |
| 2030073 | 9/1969 | Fed. Rep. of Germany . |
| 7540922 | 4/1976 | Fed. Rep. of Germany . |
| 3345932A1 | 12/1983 | Fed. Rep. of Germany . |
| WO89/10648 | 11/1989 | PCT Int'l Appl. . |
| 1324176 | 7/1973 | United Kingdom . |
| 2138639 | 10/1984 | United Kingdom . |

*Primary Examiner*—Gary F. Paumen
*Attorney, Agent, or Firm*—Herbert G. Burkard; Z. Stephen Zavell

[57] ABSTRACT

A hinge gel-filled environmental sealing and security protection device particularly designed for coaxial cables is described. More specifically, the invention utilizes at least one longitudinal pin and click-n-lock receptacle with a hinge opposite thereto.

8 Claims, 6 Drawing Sheets

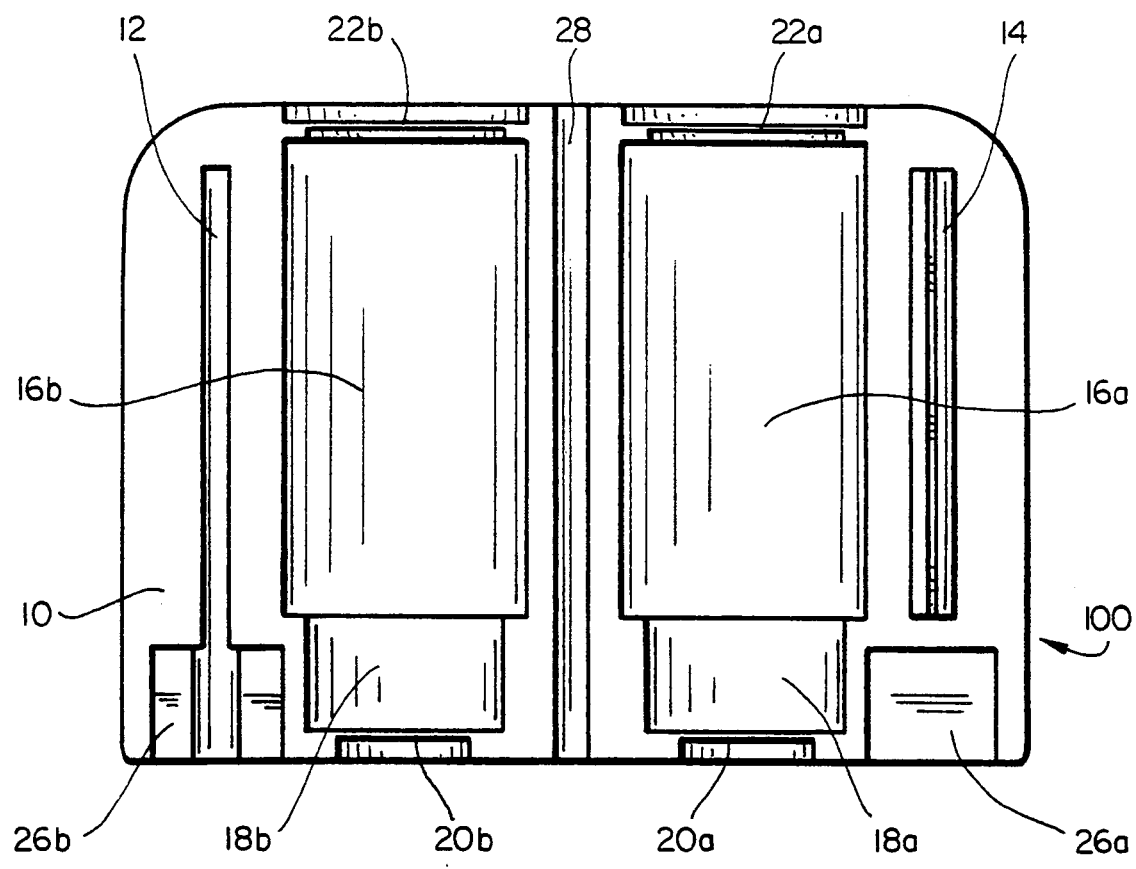
FIG_1
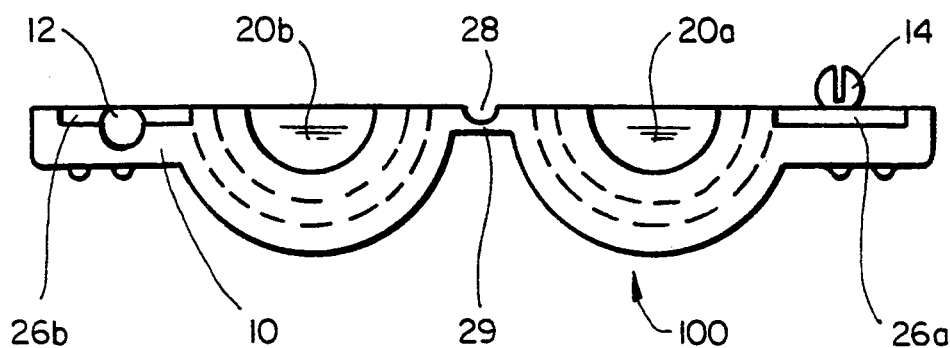
FIG_2

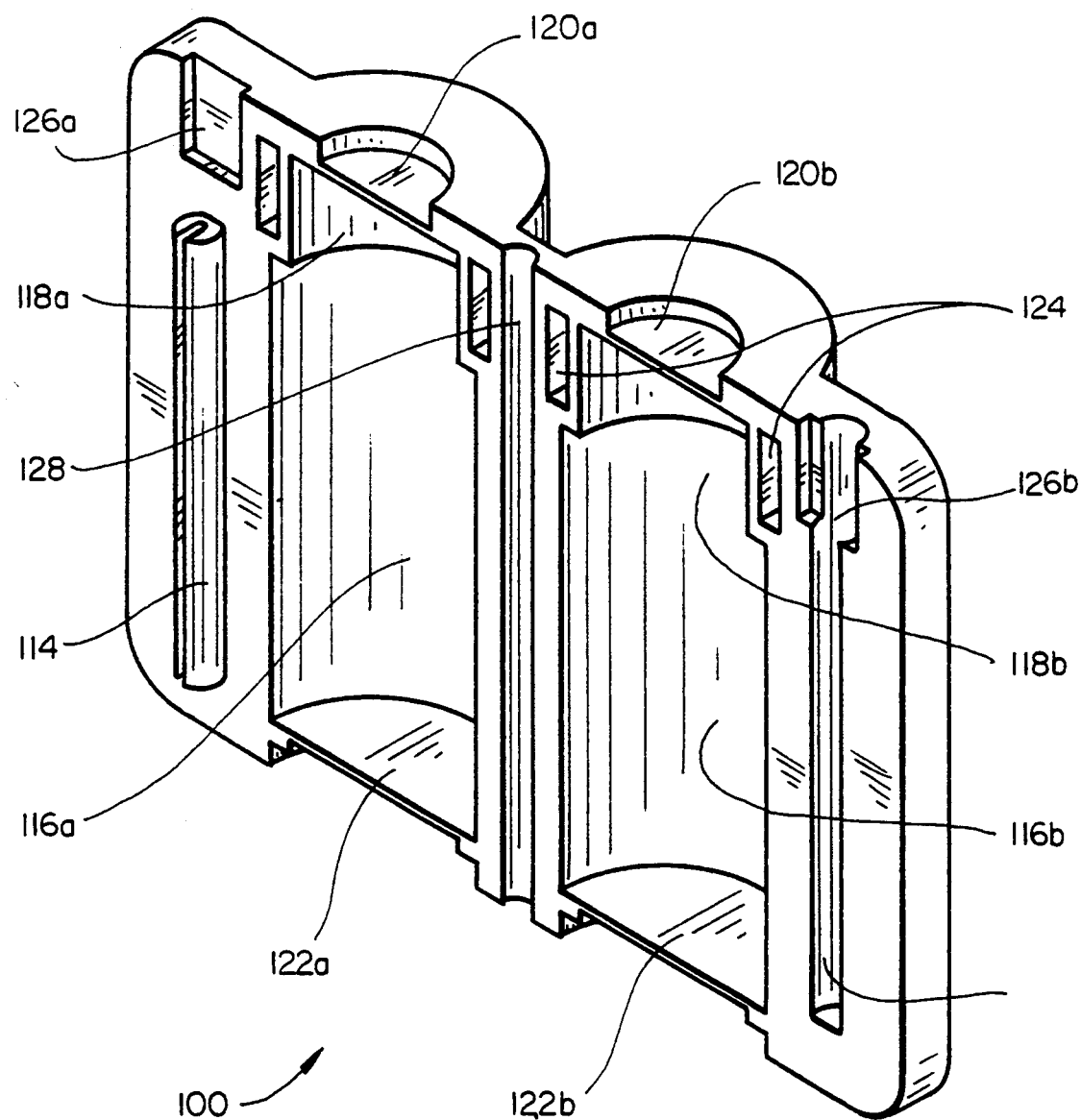
FIG_3

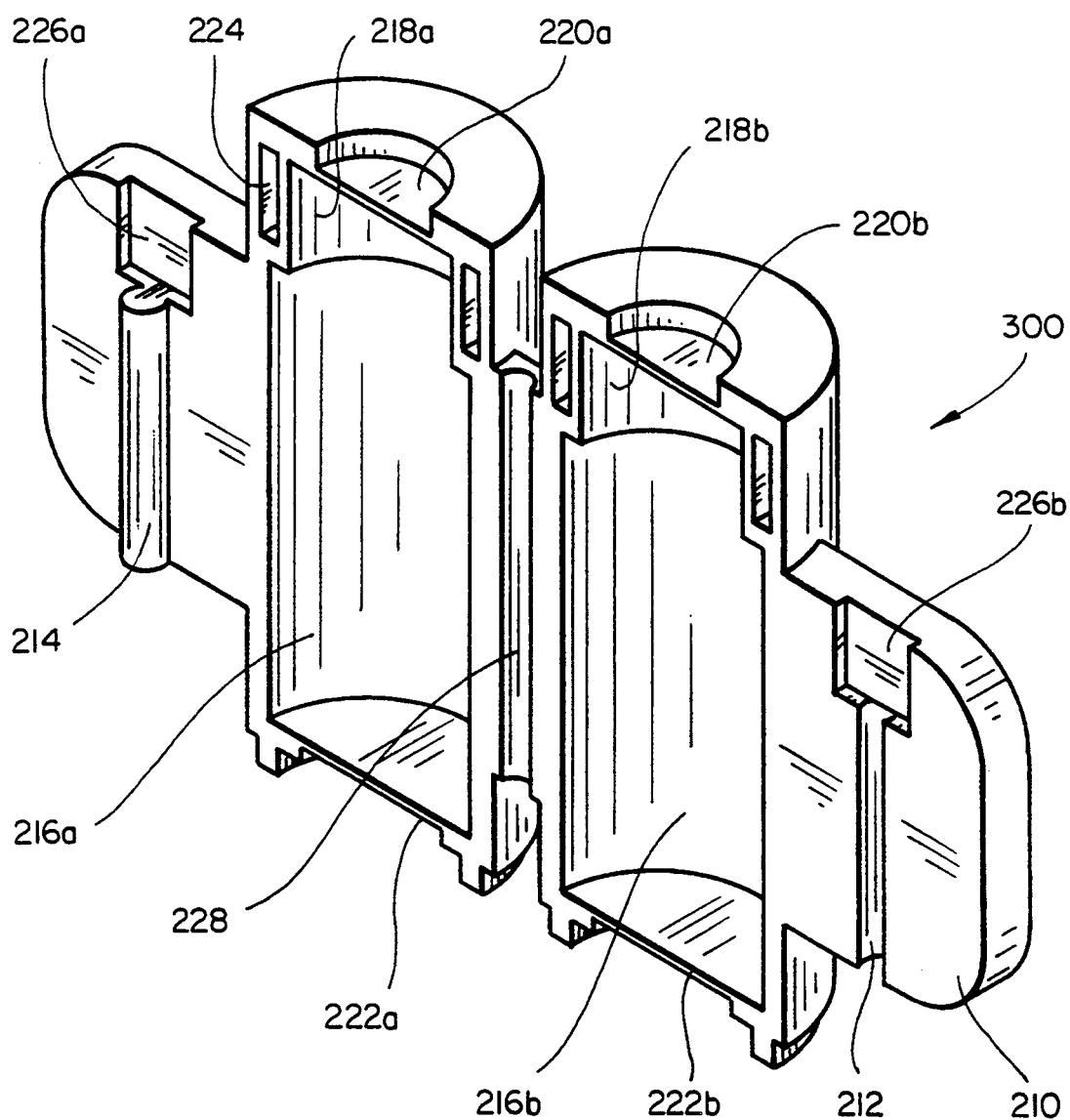
FIG_4

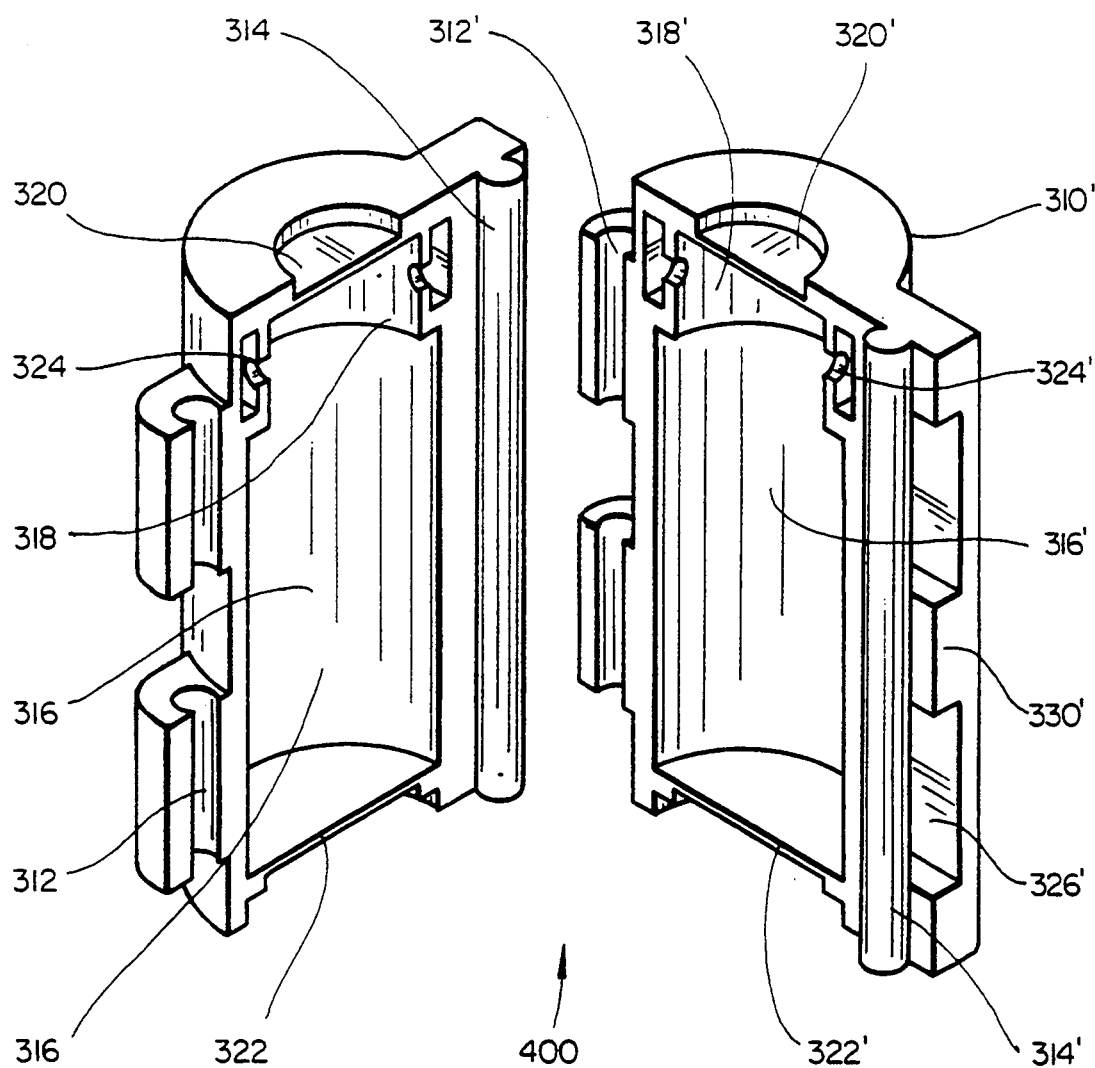
FIG_5

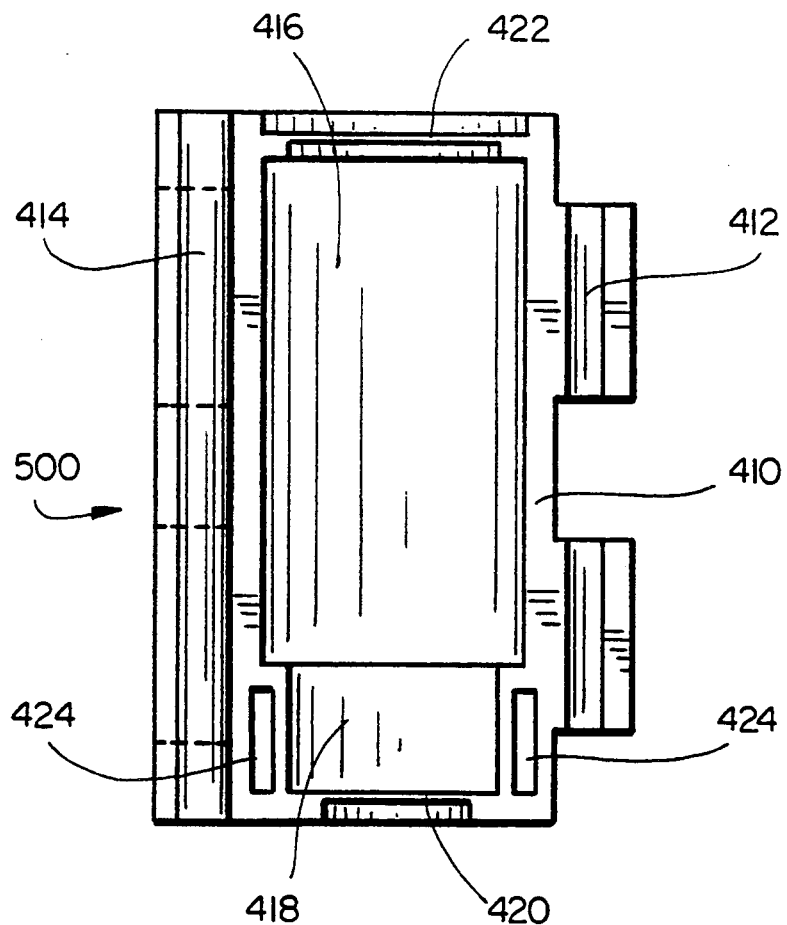
FIG_6
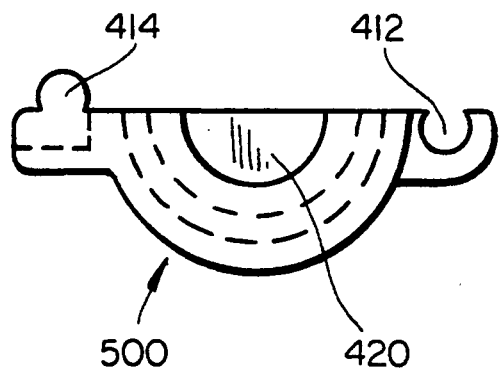
FIG_7

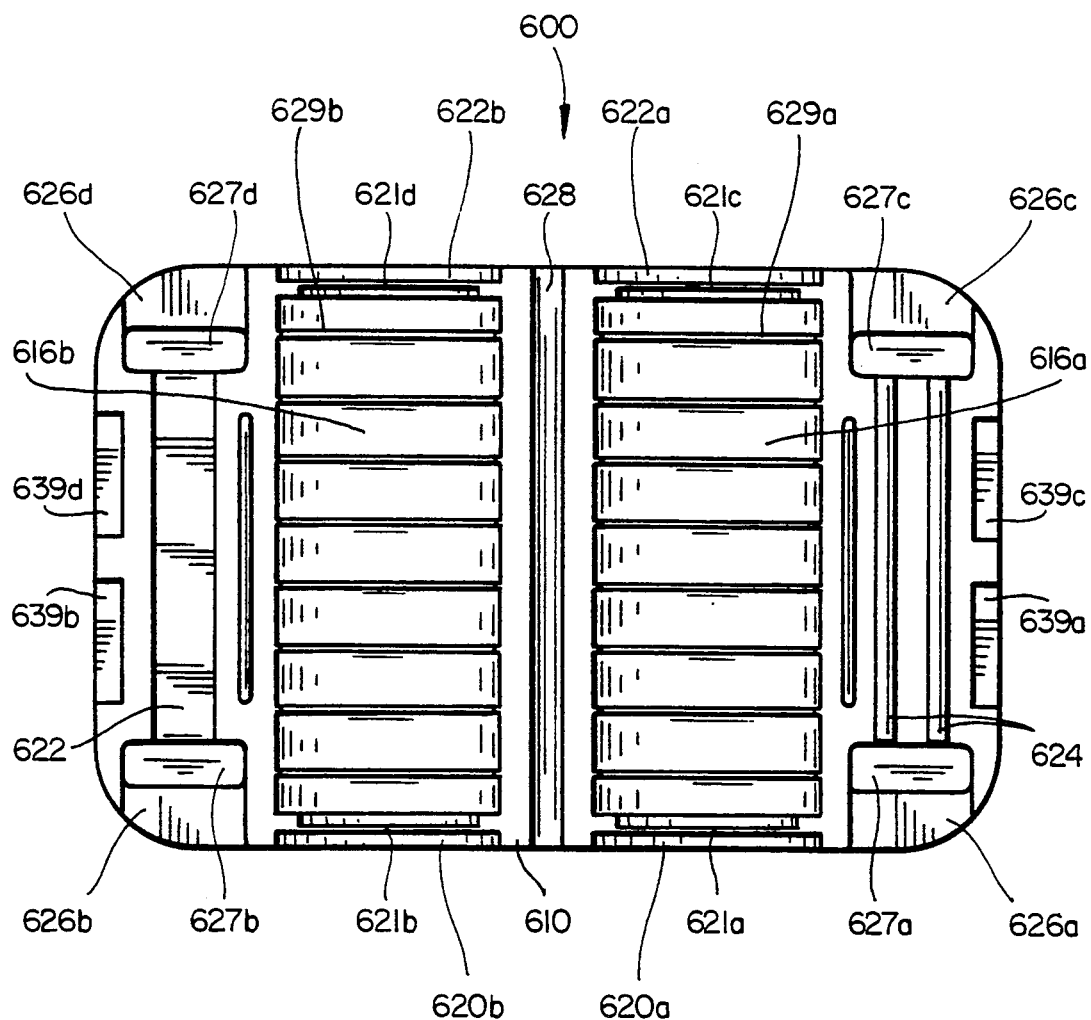
FIG_8

HINGED GEL-FILLED SECURITY AND ENVIRONMENTAL PROTECTION DEVICE

REFERENCE-TO RELATED APPLICATION

This application is a continuation-in-part application of U.S. Ser. No. 07/712,320 filed Jun. 7, 1991, now abandoned. The complete specification of the prior application is incorporated herein by reference for all purposes.

TECHNICAL FIELD OF THE INVENTION

This invention relates to environmental sealing and protection devices. More specifically, this invention relates to hinged gel-filled environmental sealing devices particularly adapted for coaxial cable splices.

BACKGROUND OF THE INVENTION

When an elongate substrate such as a coaxial or telephone or electrical cable is spliced or otherwise terminated and connected to a housing or device, it is necessary to protect the cable connectors including the exposed interior conductors, the connector body and the port or the signal will be affected. More specifically, when a coaxial cable is spliced, both the exposed interior of the cable and the connection must be protected from moisture ingress to permit a high quality signal to be transmitted across the splice or transferred to the splitter box or amplifier.

Within the past several years, gel materials such as silicone gels, polyurethane gels, polyurea gels, thermoplastic gels such as Kraton ® polymers and extender oils, and the like, have been used to seal elongate substrates. These gels most effectively seal for reentry when the elongate substrate is sealed under compression and not potted around the substrate to be sealed. More specifically, the gel is generally cured apart from at least a portion of the substrate and thereafter brought into contact with the complete substrate and the gel placed under compression to seal the substrate through either a spring or restraining the displaced movement of the gel with an enclosure. Suitable examples reciting gels and/or enclosures are illustrated in U.S. Pat. Nos. 4,610,738; 4,909,756; 4,859,809; 4,600,261; 4,634,207; 4,942,270; 4,639,284; 4,595,635; 4,777,063; 4,716,183; and U.S. Pat. No. 4,998,894. The complete disclosures of each of these patents is incorporated herein by reference.

It would be highly desirable to have an enclosure which hinges and locks together with an audible sound or tactile response, such as a click, to ensure positive protection while maintaining the features of reenterability and reusability when necessary. Preferably, the device is either a one piece unit or at least hermaphroditic, i.e., capable of two like pieces fitting together to form the enclosure.

SUMMARY OF THE INVENTION

The invention provides for the previously recited desirable features as well as many other features obvious to ordinary skilled artisan. More specifically, the device can lock around an elongate substrate such as a coaxial cable splice or over the end of a coaxial cable connector and a splitter or amplifier port to protect the coaxial cable, the connector, and the device to which is attached. The device may be removed by inserting a tool such as a thin blade or screwdriver into a provided slot and twisting the tool to move the two halves apart. The device can be closed around and seal an existing cable connection without external heater tools and the locking mechanism on the tab provides an audible click which provides a positive indication for the installer that the part is locked. The interior of the device is fabricated to extrude at least a modest portion of gel material out the ends of the device to provide a visible indication that the cavity is under sealing engagement with the elongate substrate. Optionally, the locking device can be fabricated with a tab to prevent it from spinning around the connection to a cable port such as an "F" port. Optionally, one part employs a tongue-in-groove design to further protect the interface from water ingress. Additionally, an optional overflow port can be included to assist the filling of the device with gel during manufacture.

BRIEF DESCRIPTION OF THE DRAWINGS

FIG. 1 illustrates a top plan view of an embodiment of the invention.

FIG. 2 illustrates an end view of the embodiment of FIG. 1.

FIG. 3 illustrates an angled perspective of an alternative embodiment in incorporating many of the features of the embodiment illustrated in FIGS. 1 and 2.

FIG. 4 illustrates a further embodiment of the invention.

FIG. 5 illustrates a two-part embodiment of the invention.

FIG. 6 illustrates a preferred embodiment of the invention of FIG. 5.

FIG. 7 illustrates an end view of the embodiment in FIG. 6.

FIG. 8 illustrates a top plan view of a particularly preferred embodiment which is symmetrical about the living hinge.

DESCRIPTION OF THE PREFERRED EMBODIMENTS

The invention will be described with particular reference to the appended drawings. FIGS. 1 and 2 should be viewed in conjunction and FIGS. 3 and 4 providing alternative embodiments to the basic embodiments of FIGS. 1 and 2 while FIGS. 5, 6, and 7 provide illustrations of embodiments with two hinges. For the sake of brevity, items which are substantially identical in function between the various embodiments utilize the same last two digits for numeral identification while differing in the hundreds unit digit from embodiment to embodiment in FIGS. 1–7.

Turning now to the single longitudinal pin embodiment illustrated in FIGS. 1 and 2. A first embodiment will be more clearly illustrated by referring to Figs I and 2 which also highlight many common aspects of the invention across FIGS. 1–7. The environmental seal and locking device is illustrated as 100 in FIGS. 1 and 2. The device includes a body 10 including a longitudinal pin receptacle member 12 and a slotted longitudinal pin member 14 which closes and locks together around the living hinge illustrated as 28. FIG. 2 illustrates an optional breakable hold open web member 29. The web member 29 is molded into the center or at an edge, as illustrated, or edges of the living hinge 28 as a thin piece of the same plastic to hold the device 100 rigidly open during filling and curing of the gel in the cavities. The web member 29 is sufficiently thin to be easily broken by the installer when closing the device around the elongate substrate. This feature is includable in all the living hinge embodiments.

The device 100 further includes a main cavity formed upon closing of the device between semicircular partial cavity 16a and 16b. A shallower portion of the cavity formed by the combination of 18a and 18b permits the device to be snapped on to a cable or a splitter or like device with an interference locking-type fit. The device 100 further includes break-away end seals 20a, 20b, and 22a, and 22b, which provide end pieces upon the filling of the cavity 16a, 16b, 18a, and 18b with a suitable sealing material such as a silicone gel, urea gel, urethane gel, or any suitable gel sealing material. Preferred gels have cone penetrations as measured by ASTM D217 of about 100 to 350 ($10^{-1}$mm) preferably between 200 and 350 ($10^{-1}$mm) and ultimate elongations as measured by ASTM D638 of greater than about 100% and preferably greater than about 250%.

Particularly preferred materials are gels marketed by the Raychem Corporation under the name GelTek® gel, tough silicone gel number T894, or silicone-based gel number 612 sold by the German company Wacker, or a proprietary blend of Kraton® polymer with sufficient plasticizer oil to form a Kraton® gel. The Kraton® gel is from about 3% to about 5% Kraton® polymer with 95% to about 97% plasticizer oil. Preferably, the Kraton® polymer has a molecular weight greater than about 125,000 more preferably greater than about 225,000. A suitable example is Kraton® G1651 or Kraton® G4609 or Kraton® G4610 polymers. These polymers are ABA type styrerie-ethylene butylene-styrene polymers. In the event that the sealing material is a Kraton® gel then the end pieces 20a, 20b, 22a, and 22b are optional because thermoplastic nature of the gel permits it to be filled with its end portions being blocked in the mold and upon cooling the gel remains in place.

Optionally, if reenterability is not desired, the cavities 16a, 16b, 18a, and 18b can be filled with a two-part epoxy or even a thixotropic material such as a highly viscous grease such as a silicone grease. The device 100 additionally includes indents 26a and 26b which combine to provide a slot member upon closing of the device around the cable splice to permit the subsequent insertion of a tool such as a screwdriver or a like item to open the part up again.

The devices of the invention are preferably fabricated from materials which can provide living hinge properties such as polypropylene or nylon, optionally including glass filling. Optionally in the two longitudinal pin embodiments or with devices which need to be only opened and closed several times, polyethylene or other suitable materials can be employed. Another suitable example for the two pin devices is styrerie or polycarbonate where high impact resistance is desirable.

The elongate pin member 14 includes a slot such as a u-shaped slot as illustrated in FIG. 2, which permits the flexing of the unattached semicircular portions of the hinge pin towards each other upon the closing of the device 100 around the living hinge 28 to provide a positive sounding click lock action into receptacle member 12.

The embodiment in FIG. 3 illustrated as device 200 has reference numerals which are similar to embodiments illustrated in FIGS. 1 and 2 differing only by the 100's digit. FIG. 3 illustrates an alternative embodiment of the invention which additionally includes one or a plurality overfilling slots 124 (four slots are illustrated) to avoid close filling tolerances during filling of the main cavities 116a and 116b as well as 118a and 118b. The overfill compartments 124 permit slight overfilling of the gel during manufacturing to flow into those compartments or slots and ensure complete filling. Thus, the wall between compartment 124 and the cavity 118a and 118b is somewhat lower than the edges of the periphery of cavities 116a, 116b, 118a, and 118b.

FIG. 4 illustrates a device 300 including similarly enumerated elements to FIGS. 1 thru 3 differing only by the 100's unit digit. In this embodiment, the hinge pin and slot number 214 and 212 is somewhat shorter than the periphery of the cavity to form a wing or tab member combination. The shortened receptacle member 212 permits flexing about the base of the slot of this member so that the pin member 214 can be molded as a solid piece of material. The embodiments of FIGS. 1-4 provide a tactile and/or audible sound such as clicking to denote the firm engagement of the two parts by the installer.

FIG. 5 illustrates a hermaphroditic two longitudinal pin embodiment of the invention. The device 400 having like elements which differ from the previous embodiments merely by the 300's unit digit. Since this embodiment is hermaphroditic, i.e., the two parts are identical, the elements of the right hand side half in the illustration are listed with a prime after the number. In this embodiment, the overflow port 324 has an open u-shaped, as illustrated, or other communication with cavity half 318 rather than having a lower interior edge. This embodiment additionally includes a pin support member 330' and a plurality of unlocking sections 326' with a two-part pin receptacle 312. The embodiment 400 has the additional benefit that a pin can be initially connected to form the device in a v-shaped fashion and then hingeably rotate around the pin to lock the other pin device in place around the coaxial cable connector or cable port member to seal the elongate cable substrate.

FIG. 6 and 7 illustrate further alternative embodiments of the double pin embodiment of FIG. 5 differing only from the other embodiments in the 400's unit digit for similar elements. In this embodiment, the overflow cavity 424 is similar to embodiments in FIGS. 1-4 with a lower interior edge adjacent cavity 418 rather than a u-shaped communication slot. In both embodiments of FIGS. 5, 6, and 7, the pin members 3 14 and 414 are preferably solid with the receptacle member 312 and 412 flexing about its axis opposite to its opening periphery upon the closure of the device.

The dimensions in FIGS. 1, 2, 5, 6, and 7 illustrate general size dimensions for preferred embodiments specifically sized to fit RG59 and 6 cable and cable connectors as well as the appropriately sized cable splitter or amplifier or distribution box ports. The dimensions highlight to compactness of the design, i.e., generally only about 1.5 inches long and less than an 1.0 inch wide when closed. Larger size cables and/or connectors will, of course, require appropriately adjusted dimensions.

FIG. 8 illustrates a particularly preferred embodiment of an environmental seal and locking device illustrated as 600 which is symmetrical about the living hinge 628. This preferred embodiment contains rounded edges as illustrated. This particular design is ideally sized and suited for RG59 and RG6 cable and connectors but can be appropriately dimensioned to fit any coaxial cable.

The device has a body 610 and cavity halves 616a and 616b which when filled with gel and snap locked around the connector provide an environmental seal therefor. This particular embodiment further includes recesses 626a/626b and 626c/626d to facilitate the opening of the device with an item such as a screw driver. Additionally, the body 610 included apertures 627a/627b and 627c/627d which upon closing of the body 610 sufficiently align to permit the passage of a device such as a tie wrap or wire or some other seal to ensure a tight and/or security tagged sealing of the device. Additionally, and to assist with maintenance of the gel within the cavity, a plurality of ribs illustrated as 629a and 629b are included in the cavity halves 616a and 616b. These ribs are circumferential in the cavity halves and substantially perpendicular to the longitudinal axis of the cable which will pass through the end units 620a and 620b and 622a and 620b. The interior of the device is also preferably treated with a roughened surface or texturing process such as EDM processing to further facilitate the maintenance of the gel within the cavity halves.

To further assist in the opening of the device 600 after closing additional screw driver insertion points 639a/639b and 639c/Y639d are provided. To also assist with the snap closure of the device and/or ability to knife cut the end pieces 620a and 620b, an extremely thinned central section 621a/621b and 621c/621d of the break away member is provided within the mold. These items 621a through d are near the center of each wall and of a thinness which creates a break away point. This thin molding avoids the need to slit the ends with a knife prior to closing to facilitate the closing and thus speeds the installation.

The inner textured ribs 629a and 629b provide a surface area which is parallel to the separating force and puts the gel to shell bond in shear rather than tension. This improves reusability of the parts by improving the gel to shell bond. The roughened surface treatment, EDM texture within the parts also allows for increased surface area and microscopic undercuts which further improve the gel adhesion to the shell. The male portions of the latch 624 were opened up such that the groove running longitudinally therealong is more of a V shape and allows more room for gel which may get in the latch while still permitting closing. An additional benefit of the symmetry of the part and the wider slot is that water does not get trapped in the screw driver slot or the latch but drips through. The latch continues to provide a barrier along the side of the part, hold the two halves of the part together and removing stain from the hinge and facilitating the opening and the closing of the body. Finally, the socket receptacle side 622 of the latch for an RG59fRG6 cable was thickened by about 0.01 inch to reduce the flexing of this side of the latch and provide a more secure locking and more audible clicking sound upon closure.

The invention has been described with respect to particularly preferred embodiments. Modifications which would be obvious to one of ordinary skill in the art contemplated to be within the scope of the invention.

What is claimed is:

1. An environmental protection and security device for coaxial cable splices and/or coaxial cable to tap port connections comprising:

a hinged body which includes at least one longitudinal elongate pin member and longitudinal elongate pin receptacle member on and extending along a substantial portion of opposite but peripheral edges on the device with cavity halves therebetween capable of forming an enclosure around the coaxial cable splice or the cable to tap port connection upon the closing of the device and the locking of the elongate pin and elongate pin receptacle hietubers, at least one edge of the elongate pin member or the elongate pin receptacle member including a slot to permit the dislodging of the elongate pin member from the elongate pin receptacle member through the insertion of a third body therein, and wherein the elongate pin member includes a slot along its longitudinal length permit flexing of the elongate pin member upon closing of the device and movement of the elongate pin member into the elongate pin receptacle member.

2. The device according to claim 1 further including break away members on opposite sides of the cavity and substantially perpendicular to a plane along the elongate axis of the pin and pin receptacle members.

3. The device according to claim 2 wherein the pin and pin receptacle members hinge about a living hinge between receptacle halves.

4. The device according to claim 3 wherein the cavity halves are filled with gel selected from the group consisting of a polyurethane gel, a silicone gel, a thermoplastic elastomer with plasticizing oil gel, or a polyurea gel.

5. The device according to claim 4 wherein the body is fabricated from a material selected from the group consisting of polypropylene, nylon, and polyethylene.

6. The device according to claim 5 additionally including a breakable web member across the living hinge to facilitate holding the device rigidly open during gel filling.

7. The device according to claim 6 including an overflow compartment for the cavity.

8. The device according to claim 7 wherein the gel has a cone penetration of from about 100 to about 350 ($10^{-1}$mm) and an ultimate elongation of about 200%.

* * * * *

UNITED STATES PATENT AND TRADEMARK OFFICE
CERTIFICATE OF CORRECTION

PATENT NO. : 5,347,084
DATED : September 13, 1994
INVENTOR(S) : Karen Roney, Michael Rafko It is certified that error appears in the above-indentified patent and that said Letters Patent is hereby corrected as shown below:

Column 3, line 54, replace "styrerie" with --styrene--.

Column 5, line 54, replace "RG59fRG6" with --RG59/RG6--.

Column 6, line 21, Claim 1 replace "nietubers" with --members--.

Signed and Sealed this

Fifteenth Day of November, 1994

Attest:

BRUCE LEHMAN

*Attesting Officer*   *Commissioner of Patents and Trademarks*